Feb. 10, 1970   J. J. JUDGE   3,494,229
TOOL HOLDER APPARATUS
Filed Aug. 3, 1967   2 Sheets-Sheet 1
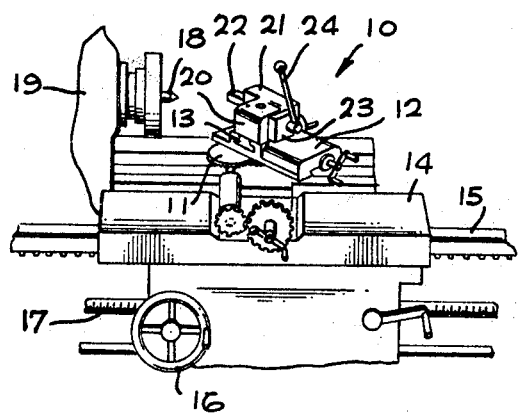
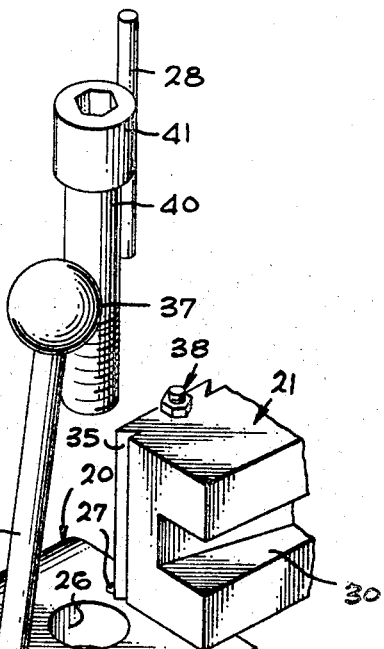
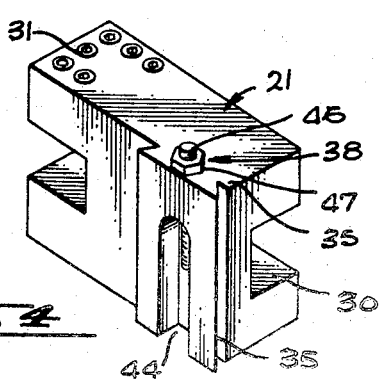
INVENTOR.
JOHN J. JUDGE
BY
Roger A. Marrs

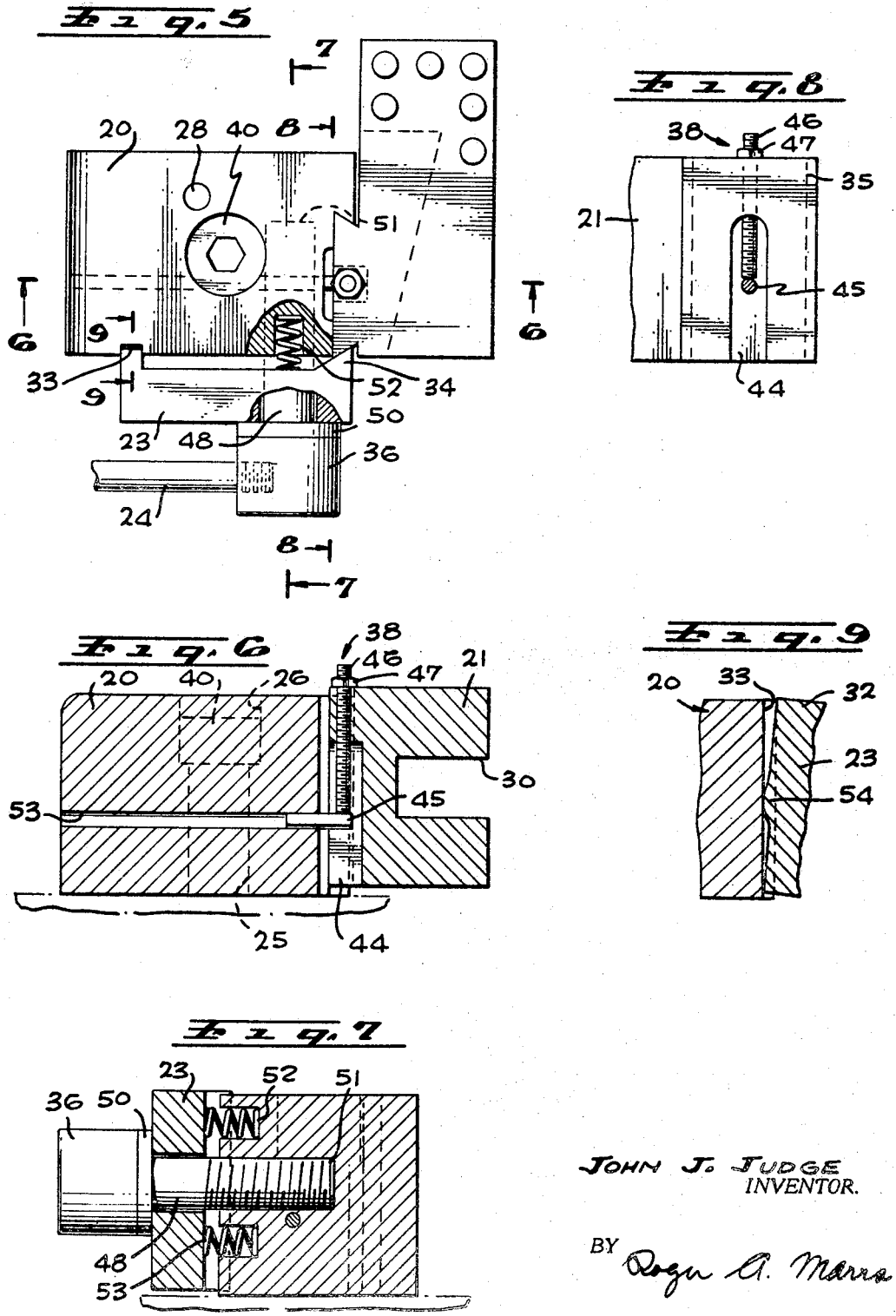

United States Patent Office 3,494,229
Patented Feb. 10, 1970

3,494,229
TOOL HOLDER APPARATUS
John J. Judge, Los Angeles, Calif.
(20314 Clark St., Woodland Hills, Calif. 91364)
Filed Aug. 3, 1967, Ser. No. 658,139
Int. Cl. B23b 29/00
U.S. Cl. 82—36                                       4 Claims

ABSTRACT OF THE DISCLOSURE

A tool holder apparatus is disclosed herein having a body block formed with a dove-tail groove adapted to be insertably received with a mating dove-tail portion carried on a tool bit adapter so that the tool bit is cantilevered laterally from the body block in working relationship with a workpiece. Means are provided for adjusting the height of the tool bit adapter with respect to the workpiece while clamping means are employed to releasably lock the adapter into place against the body block by utilizing left-hand threads for rotatably coupling the manual handle lever to the body. A raised portion is formed at the mid-section of the clamping means guide flange to effect self-locating thereof and to assure a positive fit between the clamping means and the tool bit adapter.

BACKGROUND OF THE INVENTION

Field of the invention

This invention relates to machine tool holders for accepting interchangeable adapters suitable for detachably mounting a plurality of metalworking tools and, more particularly, to a novel tool holder apparatus having structural features assuring positive fits between interchanging parts and which provides a high degree of accuracy in working tool location regardless of repeated parts interchange.

Description of the prior art

In the metalworking industry, a variety of metalworking machines are utilized to form and modify metal workpieces. One such machine is commonly referred to as an engine lathe which is generally considered to be an all-purpose machine tool in the metal-fabricating industry. The engine lathe is used primarily with stationary tools to remove metal from revolving bar stock, castings or forgings. Through the use of special attachments and accessories, workpiece forming operations can be performed on the lathe that are normal to other specialized machine tools such as milling, drilling and grinding machines. Obviously, means must be provided for turning the workpiece to be operated upon and stationary means must be provided for holding the tool cutter of bit designed to operate upon the moving workpiece.

It is the customary practice in the industry to employ a tool holder for detachably securing the cutting implement to a cross-slide member movably carried on the lathe. The tool holder is a device for holding a cutting tool in a definite position with respect to the tool slide member on which it is mounted on the machine tool. Some tool holders are provided with a means for adjusting the tool point with respect to the center line of the work such as by means of a rocker base or by means of shims. In many instances, tool holders are frequently constructed to mount more than one cutting tool. However, it has been found that the rocker base type of tool holder is not readily usable for tipped tools owing to a tendency toward vibration and undesirable overhang of the tool tip and that the use of shims does not provide required accuracy. In all cases, particularly where carbide-tipped tools are utilized, special attention must be given to the support of tipped tools to reduce their deflection under the cutting load to a minimum since the deflection thereof increases as the cube of the overhang. Preferably, the overhang should never exceed one-half the height of the tool. In an effort to reduce the amount of tool-tip overhang, it has been the conventional practice to provide a sliding block for supporting the cutting tool on the body of the tool holder whereby the block may be slid outwardly from the end of the holder immediately below the shank of the tool cutter so as to offer proper support for both side thrust and down thrust forces when the tip of the tool engages the workpiece during the metalworking operation.

However, improvement in metalworking techniques which are permitted by modern technological approach and conceptual improvement can readily reduce the cast, complexity and suport problems of such tool holders and make such tool holders more durable by the use of a tool holder capable of mounting an accessory adapter which in turn detachably supports the cutting implement and related structure which readily accepts, positions and secures the cutting tool employed in the metalworking procedure.

Several attempts have been made in the past to provide a suitable tool holder and accessory adapter combination which will meet or exceed the above-mentioned requirements such as is represented in the prior art by U.S. Letters Patent 1,592,156; 2,205,879; 2,389,858 and 2,466,596. Although these prior devices may solve some of the problems and difficulties in the holding of tools in the metal-working industry, none of the devices completely satisfy the requirements of modern metalworking machinery and metalworking applications. For example, although the later mentioned patented device includes a tool holder body capable of holding a detachable adapter by means of a dove-tail interconnection, no means are provided for preventing the collection of metal chips from gathering between the mating surfaces which restrict or weaken the interconnection between the parts. Also, although a height adjustment is provided for varying the vertical location of the tool tip with respect to the workpiece is provided, the means therefor are relatively complex and require frequent replacement due to binding and thread deterioration after repeated usage. Another major disadvantage resides in the fact that the clamping means employed in the prior art devices are not positive in nature so as to assure a properly mated fit between the clamping flange and the adapter so that the adapter is properly located on the tool holder body within acceptable tolerances. The clamping means is operated in such a manner that the manual handle therefor rotates in a direction which is unnatural to the manual dexterity of the operator so that the handle is positioned in close proximity to the cutting tool when the adapter is clamped to the tool holder body.

SUMMARY OF THE INVENTION

The difficulties and problems encountered with conventional tool holders are obviated by the present invention which provides, in general, a body block having a resiliently biased clamping means operable in a normally backward direction to releasably lock an adapter in a predetermined position so as to project the tip of a metalworking tool in the direction of a workpiece intended to be operated upon. The clamping means includes a raised mid-section formed in a guide flange disposed within a lateral slot in the body block and operable to properly seat the clamping means against the body block so that a positive fit is produced between a locking flange and the adapter. Adjustment means are provided which extend between the body block and the tool carrying adapter for precisely adjusting the height of the tool tip with respect to the workpiece. This latter means operates in cooperation with a stop means carried on the body block upon which the adapter rests. The adapter is movably carried on the body block by means of a dove-tail interconnection which permits vertical movement therebetween to accommodate vertical height adjustment and further includes cooperating recesses adapted to prevent the collection or gathering of metal chips or the like which would otherwise cause binding or an uneven fit. Means are employed for indexing the body block to the T block carried on the cross-slide member of the lathe so that the tool holder apparatus is anchored thereto.

Therefore, it is a primary object of the present invention to provide a novel tool holder having a body block capable of releasably holding a tool bit adapter for detachably carrying a tool bit such that the body block includes a resiliently biased clamping means adapted to clamp a variety of interchangeable adapters to the body block so that repeatability in tool accuracy with respect to the workpiece is assured.

Another object of the present invention is to provide a novel tool holder apparatus adapted to amount of plurality of interchangeable tool bit adapters which includes a clamping means for locking a selected adapter to the body block having a rotatable handle for actuating the clamping means so that the selected adapter is locked in the backward or rearmost position of the handle.

Another object of the present invention is to provide a novel tool holder having a resiliently biased clamping means which exerts sufficient pressure thereon during the removal or replacement of an adapter to the body block to assure that the clamping plate will not fall from the body block or interfere with the removal or replacement of the adapter.

Another object of the present invention is to provide a novel tool holder for lathes including a resiliently biased clamping plate having a pair of flanges wherein one flange is adapted for locking a tool bit adapter to a body block while the opposite flange is employed to guide the clamping plate with respect to the body block and which further includes a mid-section raised portion on the guiding flange to make the clamping plate self-locating and assuring that the locking flange will have a positive fit against the adapter.

Still a further object of the present invention is to provide a novel tool holder having a height adjustment means interconnected between the body block and the tool bit adapter so that vertical adjustment may be achieved without encountering binding forces with respect to the adapter and body block interconnecting surfaces.

Yet another object of the present invention is to provide a pair of mating reliefs or recesses formed in the interconnection portions of the tool block and adapters for achieving a more positive fit and repeating accuracy than can be achieved with conventional tool holders and which is especially suited for achieving chip clearance.

A further object of the present invention is to provide a novel tool holder having a positive anchoring means for sealing and indexing the body block thereof to the cross-slide T block of the lathe so that added rigidity and tool holder accuracy is achieved.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of the novel tool holder apparatus of the present invention illustrated as being mounted on a typical lathe;

FIGURE 2 is an enlarged perspective view of the tool holder shown in FIGURE 1 including clamping means for detachably mounting a tool bit adapter to the body block for carrying a tool bit as illustrated in broken lines;

FIGURE 3 is an exploded perspective view of the tool holder illustrating the relationship of major components thereof;

FIGURE 4 is a perspective view of the tool bit adapter employed with the tool holder as shown in FIGURES 1–3;

FIGURE 5 is a plan view of the tool holder apparatus shown in FIGURE 3 illustrating a portion thereof broken away to expose internal resilient means for biasing the clamping means;

FIGURE 6 is a transverse cross-sectional view of the tool holder apparatus as taken in the direction of arrows 6—6 of FIGURE 5;

FIGURE 7 is a longitudinal cross-sectional view of the tool holder apparatus of FIGURE 5 as taken in the direction of arrows 7—7 thereof;

FIGURE 8 is a rear elevational view of the tool bit adapter as taken in the direction of arrows 8—8 of FIGURE 5; and FIGURE 9 is a fragmentary view, in section, of the guide flange carried on the clamping means as taken in the direction of arrows 9—9 of FIGURE 5.

DESCRIPTION OF THE PREFERRED EMBODIMENT

Referring to FIGURE 1, the tool holder apparatus of the present invention is indicated in the general direction of arrow 10 and is illustrated as being mounted on a ball-turning rest 11 by means of a cross-slide member 12 carrying a T block 13. Only a portion of an overall lathe is illustrated wherein the ball-turning rest is mounted on a carriage 14 supported on a way 15. The carriage is moved rectilinearly by means of handwheel 16 via lead screw 17. A workpiece, to be operated on by the cutting tool, is carried on a headstock 18 which is suitably coupled to a motor for rotation which is housed within casing 19. It is to be understood that the tool holder apparatus of the present invention may be employed in connection with a variety of metalworking machinery and that the engine lathe as illustrated is only one such machine and that the lathe per se does not form a part of the present invention.

The tool holder apparatus comprises, in general, a body block 20 which is carried directly on the T block 13 and an adapter 21 for detachably mounting a cutting tool 22. The adapter is locked to the body block by means of a clamp plate 23 which is operable in response to the rotary movement of a handle 24 to achieve releasable locking of the adapter.

Referring now to FIGURE 2, the body block 20 is provided with a central hole 25 through which a mounting bolt is inserted for securement to the T block 13. The upper portion of the hole 25 is enlarged as indicated by numeral 26 to accommodate the head of the bolt. A second hole 27 is vertically formed in the body block parallel to the hole 25 through which a pin 28 is inserted so as to index and suitably anchor the body block to the T block. Without the pin 28 interconnecting the body block with the T block, the body block may have a tendency to rotate about the bolt extending through hole 25, particularly when the bolt has not been properly tightened.

The adapter 21 is formed with an elongated slot 30 into which the shank of the cutting tool 22 is seated and in which the shank is fastened by means of a plurality of screws indicated by numeral 31. The adapter is locked to the body block by means of the clamp plate 23 which includes a guide flange 32 disposed within a slot 33 formed in the body block and a bevelled flange 34 adapted to releasably engage with one side of a dove-tail connection 35 carried on the adapter 21. Projecting outwardly from the side of the clamp plate 23, there is provided a rotatable fixture 36 connected to one end of handle 24. The opposite end of the handle 24 is provided with a knob 37. Height adjustment means 38 are carried on the adapter 21 at a location mid-way between opposite angular flanges of the dove-tail interconnection 35.

Referring now to FIGURE 3, the handle 24 is illustrated in a position more forward than the rearmost position shown in FIGURE 2 so that the clamp plate 23 effectively releases the adapter 21 from its locked position on the body block 20. However, it is to be noted that the guide flange 32 is still in a loose interconnection with the body block while the opposite bevelled flange 34 is relatively free.

A bolt 40 is passed through hole 25 to anchor the body block onto the T block. Enlarged counterbore portion 26 is suitable for accommodating the bolt head 41 when the bolt 40 is properly installed.

With respect to FIGURES 3 and 4, it is to be noted that the body block 20 includes a recess 42 which extends from the top to the bottom of the body block substantially spaced equidistant from its opposite sides. Recess 42 is situated between a wedged groove 43 adapted to receive one flange of the dove-tail construction 35 while the opposite flange of the dove-tail construction is engaged by the bevelled flange 34 of the clamping plate. The recess 42 is aligned with a mating recess 44 formed in the dove-tail connection 35 of the adapter 21. By providing corresponding recesses 42 and 44, the collection of chips is avoided since the chips will merely pass through the recesses and drop beneath the interconnection between the adapter and the body block so that binding between these two parts is avoided.

Furthermore, it is to be noted that the extreme end of a rod 45 outwardly projects from the body block into the recess 42. The extreme end of rod 45 is employed to mount the adapter 21 in addition to the dove-tail construction by means of the height adjustment means 38. This latter means comprises a screw 46 which is threadably mounted through the dove-tail construction so that its lower end terminates within the recess 44 in engagement with the terminating end of pin 45. The screw 46 is threadably engaged within a stop nut 47 which rests on top of the adapter at the dove-tail construction so that the screw 46 can be locked in position. Screw 46 functions substantially as a lead screw to raise and lower the adapter as desired as it rotates on the pin 45. When the adapter is being raised or lowered, the opposite sides of the dove-tail construction 35 will be loosely mated with the bevelled flange 34 on one side and the wedged flange 43 on its opposite side.

Referring now in detail to FIGURE 5, it is to be noted that the clamp plate 23 is carried on a shaft 48 wherein one end of the shaft terminates in fixture 36 which rotates with respect to a collar 50 fixed to the external surface of the plate 23. The shaft projects into a bore formed in the side of the body block 20 as indicated by numeral 51. The plate 23 is tensioned or biased outwardly from the side of the body block 20 by means of a pair of expansion springs 52 and 53 which are shown more clearly in FIGURE 7. The expansion springs are located above and below the bolt shank 48. The bolt shank 48 is provided with left-hand threads so as to effect closure of the clamp plate against the adapter when the handle 24 is moved in a rearward direction which would be in the direction of the operator standing adjacent the lathe. The forward direction of rotation would place the handle 24 across the carriage of the lathe and would represent the open position of the clamp plate whereby the adapter could be readily adjusted in height or removed for interchange.

Referring now in detail to FIGURES 6 and 8, it can be seen that the height adjustment means provides a positive stop for the adapter 21 so that the adapter is mounted directly on the terminating end of pin 45 which projects into recess 42. The mounting is produced by the terminating end of the screw 46 which rests directly on the pin 45. Nut 47 is threadably engaged with the screw 46 so that as the nut 47 is rotated, the adapter will move in a vertical direction in accordance with the direction of nut rotation as the screw turns on the pin 45. It is to be particularly noted that the pin 45 is carried in an elongated bore 53 formed in the body block 20. The entrance of the bore 53 is open on the side of the body block from the side from which the pin 45 projects. In this manner, as the pin 45 begins to wear or otherwise become damaged so that its usefulness is affected, the pin may be readily moved and another pin inserted through the bore 53. The removal of the pin may be effected by placing a punch or other type of implement through the bore 53 and knocking or forcing the pin 45 from its seat.

With respect to FIGURE 9, it can be seen that the guide flange 32 of the clamp plate includes a raised mid-portion indicated by numeral 54 which is illustrated in a highly exaggerated illustration to show that the clamp plate 23 is self-locating by means of the raised portion 54. The raised portion serves as a pivot point about which the plate may slightly rotate and the rotation is accommodated by means of the springs 52 and 53. Thereby, a positive connection will ensure with respect to the bevelled flange 34 on the opposite end of the clamp plate and the dove-tail construction 35 of the adapter.

By means of the tool holder apparatus of the present invention, any number of tool bits may be interchangeably placed in the receiving slot 30 on the adapter. Furthermore, a plurality of adapters may be employed with the body block 20 depending upon the particular tool adapter that is required for a particular job, such as a facing tool, turning tool, drilling tool, boring tool, threading tool or cutting tool. All these tools are exemplary of the type of metal cutting operation which can be achieved with the use of the tool holder apparatus of the present invention and which can readily be accommodated at the start of the job by the operator at the lathe so that no time is lost in making the necessary change from one tool to another during the metalworking procedure. In using the tool holder of the present invention, in the event a tool becomes dull or broken, the operator releases the screws 31 and the tool bit 22 may be readily released for replacement. Also, the tool operator may rotate the handle 24 so as to unlock the clamp plate 23 from the adapter and the adapter moved upwardly for removal from the body block. The tool may either be resharpened or replaced and the adapter remounted on the body block 20.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. In a tool holding apparatus for lathes, the combination comprising:
   a body block having a dovetail receiver integrally formed therein;
   an adapter having a dovetail portion adapted to be insertably coupled to said dovetail receiver so that said adapter is laterally cantilevered from said body block and being further adapted to detachably hold a tool bit arranged to project outwardly towards a workpiece;
   a clamp plate movably mounted on said body block having a guide flange formed along one side thereof in communication with said body block and a bevelled flange formed along the other side of said plate constituting one side of said dovetail receiver, said clamp plate guide flange including an integrally formed raised portion located mid-way between its opposite ends adapted to rockably engage with said body block so as to effect self-positioning of said clamp plate in its locking position;

handle means operably rotatably mounted on said body block via a left-hand threaded arrangement operable to selectively move said clamp plate into a lock position at the rearmost position of said handle means to retain said adapter on said body block;

said handle means including a bolt having a headed fixture disposed against the external surface of said clamp plate to which an elongated handle is affixed and having a left-handed threaded shank extending through said clamp plate in threaded connection with said body block;

Biasing means extending between said body block and said clamp plate exerting a force thereon to normally maintain said clamp plate in an unlocked position, said biasing means including a pair of resilient springs in vertical alignment separated by sad bolt shank arranged in compression between the inner surface of said clamp plate and said body block;

an elongated rod intercoupling said body block with the lathe mount supporting said body block whereby said body block is indexed thereto and prevented from rotating during workpiece forming procedures; and means interconnecting said adapter to said body block for adjusting said adapter and the tool bit carried thereby relatively to the workpiece.

2. The invention as defined in claim 1 wherein said adjustment means includes a rotatable screw threadably carried on said dovetail portion of said adapter extending into a recess formed therein and a pin secured to said body block having a terminating end projecting into a recess formed in said dovetail receiver whereby the extreme end of said screw rotatably seats on said pin terminating end so that said adapter is moved vertically in response to rotation of said screw when said clamp plate is in said unlocked position.

3. The invention as defined in claim 2 wherein said dovetail portion recess and dovetail receiver recess are arranged opposite each other in corresponding relationship to provide a combined enlarged opening through the bottom of the tool holder apparatus sufficient to prevent the gathering of chips or foreign matter between said dovetail portion and said dovetail receiver.

4. The invention as defined in claim 3 including a nut threadably engaged on said screw adapted to butt against the top of said adapter so as to lock said screw against rotation to releasably fix the tool bit relative to the workpiece.

References Cited

UNITED STATES PATENTS

| 2,466,596 | 4/1949 | Krause | 82—36 |
| 2,972,272 | 2/1961 | Sirola | 82—36 |
| 3,136,030 | 6/1964 | Jarrett | 82—36 XR |

FOREIGN PATENTS

| 934,205 | 1/1948 | France. |
| 1,004,696 | 11/1951 | France. |

LEONIDAS VLACHOS, Primary Examiner